US012758925B2

(12) United States Patent
Liu et al.

(10) Patent No.: US 12,758,925 B2
(45) Date of Patent: Oct. 13, 2026

(54) METHOD FOR PREPARING SELF-SUPPORTING COMPOSITE NANOFILTRATION MEMBRANE

(71) Applicant: Tiangong University, Tianjin (CN)

(72) Inventors: Hailiang Liu, Tianjin (CN); Yumin Sun, Tianjin (CN); Hao Cui, Tianjin (CN); Yonghui Wang, Tianjin (CN); Yang Qin, Tianjin (CN)

(73) Assignee: Tiangong University, Tianjin (CN)

( * ) Notice: Subject to any disclaimer, the term of this patent is extended or adjusted under 35 U.S.C. 154(b) by 668 days.

(21) Appl. No.: 18/203,072

(22) Filed: May 30, 2023

(65) Prior Publication Data

US 2024/0399317 A1 Dec. 5, 2024

(30) Foreign Application Priority Data

Mar. 30, 2022 (CN) ......................... 202210324473.1

(51) Int. Cl.
*B01D 69/12* (2006.01)
*B01D 61/02* (2006.01)

(52) U.S. Cl.
CPC ....... *B01D 69/1251* (2022.08); *B01D 61/027* (2013.01); *B01D 2323/081* (2022.08);
(Continued)

(58) Field of Classification Search
CPC .... B01D 39/00; B01D 39/14; B01D 39/2055; B01D 39/2068; B01D 63/00; B01D 63/08; B01D 63/081; B01D 63/087; B01D 63/088; B01D 67/0039; B01D 67/0044; B01D 67/0049; B01D 67/0053; B01D 67/0067; B01D 67/0069; B01D 67/0076; B01D 67/0079; B01D 67/00791; B01D 67/00793; B01D 67/0081; B01D 69/00;
(Continued)

(56) References Cited

U.S. PATENT DOCUMENTS

2017/0144107 A1* 5/2017 Garaj ................. B01D 67/0041
2018/0207591 A1* 7/2018 Yu .......................... B01D 69/02

FOREIGN PATENT DOCUMENTS

CN 111420563 A 7/2020

OTHER PUBLICATIONS

Hegab et al., A Novel Fabrication Approach for Multifunctional Graphene based Thin Film Nano-composite Membranes with Enhanced Desalination and Antibacterial Characteristics, Published online Aug. 8, 2017, Scientific Reports | 7: 7490 | DOI:10.1038/s41598-017-07531-y, PDF provided in file (Year: 2017).*
(Continued)

*Primary Examiner* — Allison G Fitzsimmons
(74) *Attorney, Agent, or Firm* — Bayramoglu Law Offices LLC

(57) ABSTRACT

A method for preparing a self-supporting composite nanofiltration membrane is provided. A porous graphene-based two-dimensional sheet material is prepared by taking amino graphene quantum dots as the main body and subjecting them to an interfacial polymerization reaction with polyacyl chloride, and then the porous graphene-based two-dimensional sheet material is encapsulated in-situ with polyamide by an in-situ encapsulating technology to prepare a self-supporting porous graphene/polyamide separation layer with excellent permeability and high selectivity.

8 Claims, 2 Drawing Sheets

(52) U.S. Cl.
CPC .............. *B01D 2323/21819* (2022.08); *B01D 2323/48* (2013.01); *B01D 2325/02834* (2022.08)

(58) Field of Classification Search
CPC .... B01D 69/061; B01D 69/10; B01D 69/105; B01D 69/106; B01D 69/108; B01D 69/12; B01D 69/1214; B01D 69/1216; B01D 69/122; B01D 69/125; B01D 69/1251; B01D 71/00; B01D 71/02; B01D 71/021; B01D 71/0211; B01D 2239/10; B01D 2323/40; B01D 2323/50; B01D 2325/04; B01D 2325/06; B01D 67/0006; B01D 67/0088; B01D 69/02; B01D 69/107; B01D 69/148; B01D 71/0212; B01D 71/024; B01D 71/0281; B01D 71/56; B01D 71/68
See application file for complete search history.

(56) References Cited

OTHER PUBLICATIONS

Madni et al., Journal of Drug Targeting, 2018, vol. 26, No. 10, 858-883, Graphene-based nanocomposites: synthesis and their theranostic applications. (Year: 2018).*
2Song et al., Mater. Chem. Front., 2017, 1, 1028, Recent progress in interfacial polymerization (Year: 2017).*
Changsheng Guo, et al., Amino-rich carbon quantum dots ultrathin nanofiltration membranes by double "one-step" methods: Breaking through trade-off among separation, permeation and stability, Chemical Engineering Journal, 2021, pp.1-12, vol. 404, 127144.

* cited by examiner

METHOD FOR PREPARING SELF-SUPPORTING COMPOSITE NANOFILTRATION MEMBRANE

CROSS REFERENCE TO THE RELATED APPLICATIONS

This application is based upon and claims priority to Chinese Patent Application No. 202210324473.1, filed on Mar. 30, 2022, the entire contents of which are incorporated herein by reference.

TECHNICAL FIELD

The present invention relates to the field of nanofiltration membranes, and in particular to a method for preparing a self-supporting composite nanofiltration membrane.

BACKGROUND

As an efficient, energy-saving and environment-friendly separation technology, a membrane separation technology has become an important technology for solving the problems of energy sources, resources and environmental pollution. Currently, polymer membrane materials have developed into one of the main forms of commercial separation membrane materials because of their simple and efficient membrane forming manners and excellent separation performance. However, there is a “Trade-off” effect between permeability and selectivity of them, so it still faces certain challenges in practical application.

In recent years, more and more researchers have devoted themselves to developing some novel membrane materials, such as metal-organic frameworks, covalent organic frameworks, two-dimensional materials (graphene-based materials and MXene), aquaporins, carbon nanotubes, and the like novel materials to break through the limitations of current membrane performance. Among them, the discovery of graphene materials has aroused widespread concern on the two-dimensional materials in the field of separation membranes. The two-dimensional materials can maintain high selectivity while achieving high permeability because of their atomic-level thickness, accurately regulable separation channels, and the like characteristics, and thus become novel ideal membrane materials.

Two-dimensional graphene-based materials have become one of popular membrane materials in the field of membranes because of their excellent performance in the field of membrane separation. Their application manner in the field of membrane separation mainly includes two ways: preparing a mixed matrix membrane as a nano-filler and constructing an additional water channel. In the mixed matrix membrane, as an intercalated discontinuous filling phase, its main advantages, such as size selection of interlayer nanochannels and ultra-fast transport of water molecules, have not been fully utilized. The improvement of membrane separation performance is mainly due to the thinning of a separation layer, the improvement of surface hydrophilicity and the like reasons after a two-dimensional material is embedded in the separation layer, which has no obvious advantages compared with other nano-materials, and the corresponding agglomeration and accompanying defects will also affect the separation performance. Although two-dimensional graphene-based membrane prepared by constructing an additional water channel has an ideal application prospect, the defects of a two-dimensional graphene layered membrane are usually reduced by increasing the number of layers of the graphene material, but meanwhile, it will also increase the length of a molecular transport path in the two-dimensional graphene layered membrane, thereby affecting the permeability of the membrane. Moreover, the stability of the two-dimensional graphene layered membrane in water or other solvents is also a main factor limiting the development of the two-dimensional graphene layered membrane.

SUMMARY

In order to solve the problems existed in the prior art, an objective of the present invention is to provide a method for preparing a self-supporting composite nanofiltration membrane with excellent permeability and high selectivity.

For this purpose, the present invention adopts the following technical solution:

A method for preparing a self-supporting composite nanofiltration membrane includes the following steps:

(1) preparation of an amino graphene quantum dots: dispersing a certain amount of graphene oxide in distilled water by ultrasonic shaking to obtain a graphene oxide dispersion, then adding a certain amount of ammonia water, mixing uniformly and transferring the mixture to a reaction kettle; sealing and placing the reaction kettle in a muffle furnace for a chemical cleavage reaction, and after completion of the reaction, cooling, filtering, distilling at reduced pressure, freeze drying and conducting secondary dissolution, filtering and freeze drying to obtain the amino graphene quantum dots, where:

the concentration of the graphene oxide dispersion is 0.01-1 w/v %, and the volume ratio of the ammonia water to the graphene oxide dispersion is (1-4):1; and the temperature in the muffle furnace is 100-140° C., and the treatment time is 4-6 h;

(2) preparation of a porous graphene-based two-dimensional sheet material: placing a substrate membrane rinsed with distilled water at the bottom of a sand core funnel; preparing the amino graphene quantum dots obtained in the step (1) into an aqueous solution with a concentration of 0.01-1 w/v % and adjusting the pH of the aqueous solution to 11-13, sequentially adding the pH-adjusted aqueous solution of the amino graphene quantum dots and a polyacyl chloride organic solution with a concentration of 0.01-1 w/v % into the sand core funnel in turn, carrying out an interfacial polymerization reaction for a certain time to obtain a porous graphene-based two-dimensional sheet material; and (3) preparation of a composite nanofiltration membrane: immediately after the step (2), injecting an aqueous solution of polyamine quantitatively and uniformly into a solution obtained after the interfacial polymerization reaction in the step (2) by an injector to continue the interfacial polymerization reaction, encapsulating the porous graphene-based two-dimensional sheet material in situ by a polyamide to prepare a porous graphene/polyamide separation layer, removing an aqueous phase solution and an organic phase solution, then loading the porous graphene/polyamide separation layer onto the substrate membrane, and subjecting to heat treatment to prepare the self-supporting composite nanofiltration membrane.

Preferably, in the step (1), the pore sizes of the filter membranes selected for filtering are 0.22 and 0.1 μm, and the distilling at reduced pressure is conducted at a temperature of 70-90° C. for a time of 0.5-2 h.

Preferably, the substrate membrane in the step (2) is a polysulfone, polyethersulfone, polyvinylidene fluoride, polyvinyl chloride or polytetrafluoroethylene ultra/microfiltration membrane.

Preferably, the volume ratio of the aqueous solution of the amino graphene quantum dots to the organic solution of polyacyl chloride in the step (2) is (1-10):1, and the time of the interfacial polymerization reaction is 10-120 s.

In the aforementioned step (2), the polyacyl chloride is at least one of trimesoyl chloride, pyromellitic acid chloride, phthaloyl chloride, isophthaloyl chloride and terephthaloyl chloride; and the solvent of the organic solution is at least one of n-hexane, cyclohexane, n-heptane and isoparaffin.

In the aforementioned step (3), the polyamine is at least one of ethylenediamine, butanediamine, pentanediamine, diethylenetriamine, triethylenetetramine, tetraethylenepentamine, piperazine, o-phenylenediamine, m-phenylenediamine and p-phenylenediamine.

Preferably, the concentration of the aqueous solution of polyamine of the step (3) is 0.01-0.1 w/v %, and the time for the continued interfacial polymerization reaction is 10-120 s. The heat treatment is conducted at a temperature of 40-50° C. for a treatment time of 5-15 min.

In the present invention, the amino graphene quantum dots is obtained by chemically cleaving graphene oxide with ammonia water, the porous graphene-based two-dimensional sheet material is prepared under controlled interfacial polymerization reaction conditions by taking the amino graphene quantum dots as an aqueous phase monomer and taking polyacyl chloride as an organic phase monomer; and then by an in-situ encapsulating technology, polyamine and polyacyl chloride are subjected to an in-situ interfacial polymerization reaction to generate a polyamide membrane to encapsulate the porous graphene-based two-dimensional material at an interface. Compared with the prior art, the present invention has the following advantages.

1. The self-supporting composite nanofiltration membrane prepared by the method of the present invention has a separation layer with a complete, flat and smooth surface structure, where the ultra-thin two-dimensional porous structure of the porous graphene-based two-dimensional sheet material endows the separation layer with extremely low mass transfer resistance, greatly improves the permeation flux of the composite membrane on the premise that the rejection rate remains unchanged, and successfully overcomes the "Trade-off" effect between permeability and selectivity commonly existed in polymer membrane materials.
2. The self-supporting nanofiltration membrane containing a novel porous graphene-based two-dimensional sheet material/polyamide separation layer prepared by the method of the present invention has relatively higher permeation flux and separation performance, shows good selective separation performance, long-term operation stability and strong-alkali resistance for a dye/salt system, obviously prolongs the service life of the membrane, has a good potential application value, and has good application prospects in the fields of industrial wastewater treatment, dye desalination, chemical separation and the like. Under the pressure of 0.2 MPa, the highest permeation flux of the self-supporting composite nanofiltration membrane with the maintained rejection rate for Congo Red exceeding 99.4% can reach 28.4 $L \cdot m^{-2} \cdot h^{-1} \cdot bar^{-1}$. The displayed separation factors of the composite membranes in a Congo Red/sodium sulfate solution system are all about 100. The composite membrane still maintains a high rejection rate of 99.4% for Congo Red, while the permeation flux is slightly reduced in a long-term stability test. In a strong-alkali resistance test, its permeation flux can also be maintained above 25 $L \cdot m^{-2} \cdot h^{-1} \cdot bar^{-1}$, and the rejection rate for Congo Red is maintained above 99%.
3. The present invention creatively uses the amino graphene quantum dots to synthesize the two-dimensional porous graphene-based sheet material, which provides a new idea for the preparation of a two-dimensional porous graphene-based material and research of their application in the field of membrane separation.

DETAILED DESCRIPTION OF THE EMBODIMENTS

The technical solution of the present invention will be described in detail with reference to the accompanying drawings and examples hereafter.

Example 1

A method for preparing a self-supporting composite nanofiltration membrane included the following steps.

Figure 1:
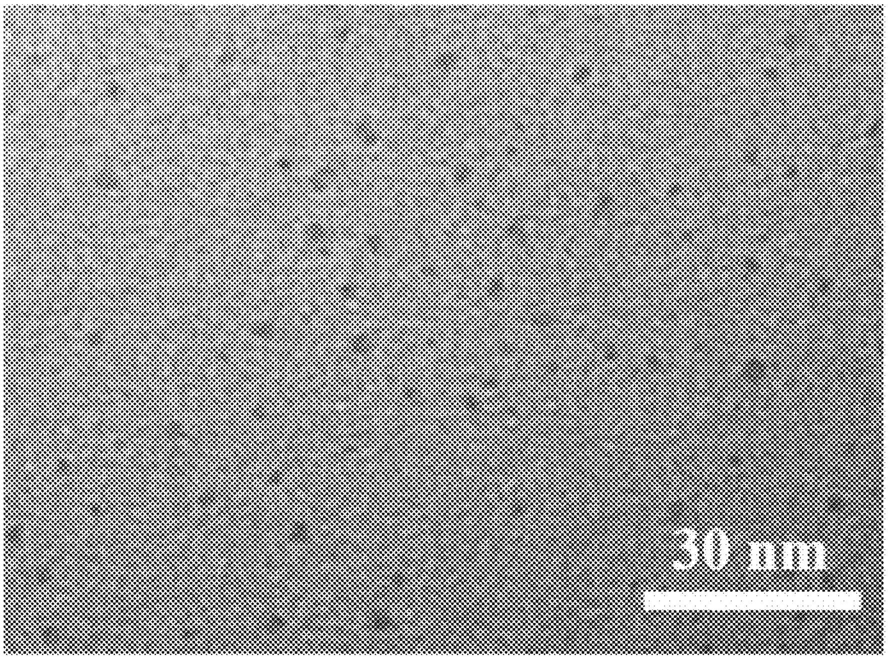
FIG. 1 is a transmission electron microscope diagram of the amino graphene quantum dots prepared in an Example.

(1) Preparation of the amino graphene quantum dots: 45 mg of graphene oxide was dispersed in 45 mL of distilled water by ultrasonic shaking, added with 15 mL of ammonia water, mixed uniformly and then transferred to a reaction kettle, and the reaction kettle was sealed and placed in a muffle furnace and reacted at a constant temperature of 120° C. for 5 h. After cooling, it was filtered by a sand core filter equipped with a polyethersulfone filter membrane (with a pore size of 0.22 μm), then the filtrate was distilled under reduced pressure in a water bath at 80° C. for 1 h, and then freeze-dried to obtain amino graphene quantum dots powder. The amino graphene quantum dots powder was re-dissolved and subjected to secondary filtration with a polyethersulfone filter membrane (with a pore size of 0.1 μm), and then freeze-dried again to obtain a light yellow amino graphene quantum dots powder, of which the transmission electron microscope diagram was shown in FIG. 1, where the particle size distribution of the amino graphene quantum dots was in a relatively narrow particle size distribution range of 2-4 nm, and an average particle size was about 3.4 nm.

Figure 2:
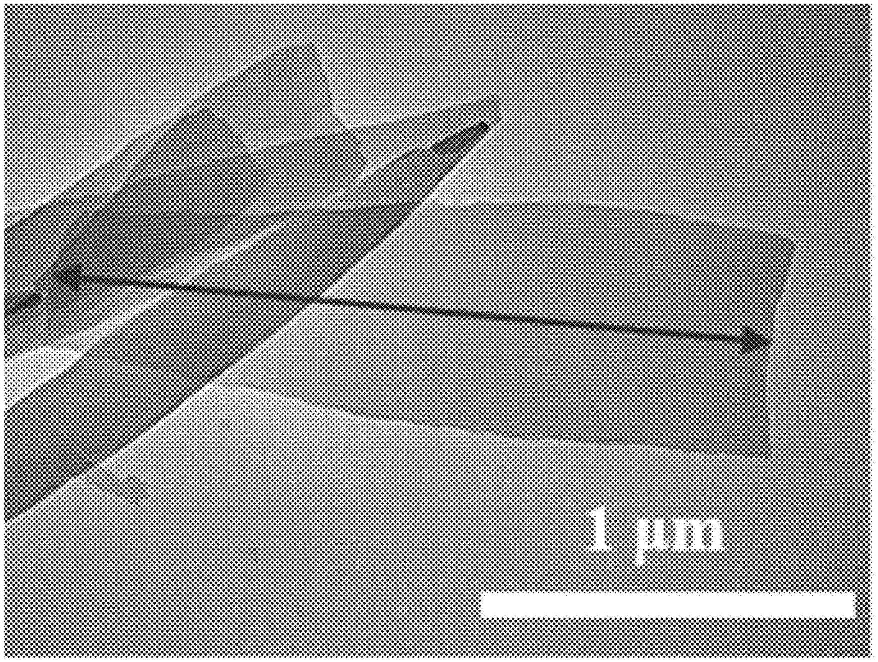
FIG. 2 is a transmission electron microscope diagram of a porous graphene-based two-dimensional sheet material obtained in the step (2) of Examples 1 and 4.

(2) Preparation of porous graphene-based two-dimensional sheet material: a Polyethersulfone filter membrane (with a pore size of 0.1 μm) was used as a base membrane, which was first rinsed with distilled water and then placed at the bottom of a sand core funnel, subsequently the light yellow amino graphene quantum dots powder obtained in the step (1) was prepared into an aqueous solution of the amino graphene quantum dots with a concentration of 0.5 w/v %, and the pH of the solution was adjusted to 12.5. 1.5 mL of this solution and 1.5 ml of a solution of trimesoyl chloride in n-hexane with a concentration of 0.1 w/v % were sequentially added into the sand core funnel, and then subjected to an interfacial polymerization reaction for 60 s to obtain a porous graphene-based two-dimensional sheet material, of which the transmission electron microscope diagram was shown in FIG. 2. For the porous graphene-based two-dimensional sheet material, the diameter was about 2 μm, the lamellar thickness was 3.2 nm, and the pore size was concentrated between 2.1-3.9 nm.

(3) Preparation of composite nanofiltration membrane: immediately after the step (2), 1.5 mL of a piperazine aqueous solution with a concentration of 0.04 w/v % was injected into the solution obtained after the interfacial polymerization reaction in the step (2) with an injector at a uniform speed, and the reaction was continued for 60 s to obtain a porous graphene/polyamide separation layer. After the aqueous phase solution and the organic phase solution were removed, the porous graphene/polyamide separation layer was loaded onto the polyethersulfone filter membrane substrate, and the obtained composite membrane was subjected to heat treatment at 45° C. for 10 min to prepare the self-supporting composite nanofiltration membrane.

The prepared self-supporting composite nanofiltration membrane was tested with a Congo Red solution system of 0.1 g $L^{-1}$ under a pressure of 0.6 MPa. It had a permeation flux of 2.9 L $m^{-2}$ $h^{-1}$ $bar^{-1}$, and a rejection rate of 99.8% for Congo Red.

Example 2

A method for preparing a self-supporting composite nanofiltration membrane included the following steps.

(1) it was the same as the step (1) of Example 1;

(2) the other steps and conditions were the same as the step (2) of Example 1 except that the time for the interfacial polymerization reaction was 10 s; and (3) preparation of a composite nanofiltration membrane: immediately after the step (2), 1.5 mL of a piperazine aqueous solution with a concentration of 0.02 w/v % was injected into the solution obtained after the interfacial polymerization reaction in the step (2) at a uniform speed, and the reaction was continued for 60 s to obtain a porous graphene/polyamide separation layer. After the aqueous phase solution and the organic phase solution were removed, the porous graphene/polyamide separation layer was loaded onto the polyethersulfone filter membrane substrate, and the obtained composite membrane was subjected to heat treatment at 45° C. for 10 min to prepare the self-supporting composite nanofiltration membrane.

The prepared self-supporting composite nanofiltration membrane was tested with a Congo Red and methyl orange solution system of 0.1 g $L^{-1}$ and a $Na_2SO_4$ solution system of 1 g·$L^{-1}$ under a pressure of 0.2 MPa. It had a permeation flux of 9.1 L·$m^{-2}$·$h^{-1}$·$bar^{-1}$, a rejection rate of 99.8% for Congo Red, a rejection rate of 43.5% for methyl orange, a rejection rate of 33.3% for $SO_4^{2-}$ ions, and a separation factor of 117.19 for Congo Red/$SO_4^{2-}$.

Example 3

A method for preparing a self-supporting composite nanofiltration membrane included the following steps.

(1) it was the same as the step (1) of Example 1;

(2) the other steps and conditions were the same as the step (2) of Example 1 except that the time for the interfacial polymerization reaction was 30 s; and (3) it was the same as the step (3) of Example 2.

The prepared self-supporting composite nanofiltration membrane was tested with a Congo Red and methyl orange solution system of 0.1 g·$L^{-1}$ and a $Na_2SO_4$ solution system of 1 g·$L^{-1}$ under a pressure of 0.2 MPa. It had a permeation flux of 13.8 L·$m^{-2}$·$h^{-1}$·$bar^{-1}$, a rejection rate of 99.5% for Congo Red, a rejection rate of 38.6% for methyl orange, a rejection rate of 30.2% for $SO_4^{2-}$ ions, and a separation factor of 92.13 for Congo Red/$SO_4^{2-}$.

Example 4

A method for preparing a self-supporting composite nanofiltration membrane included the following steps.

(1) it was the same as the step (1) of Example 1;

(2) it was the same as the step (2) of Example 1;

(3) it was the same as the step (3) of Example 2.

Figure 3:
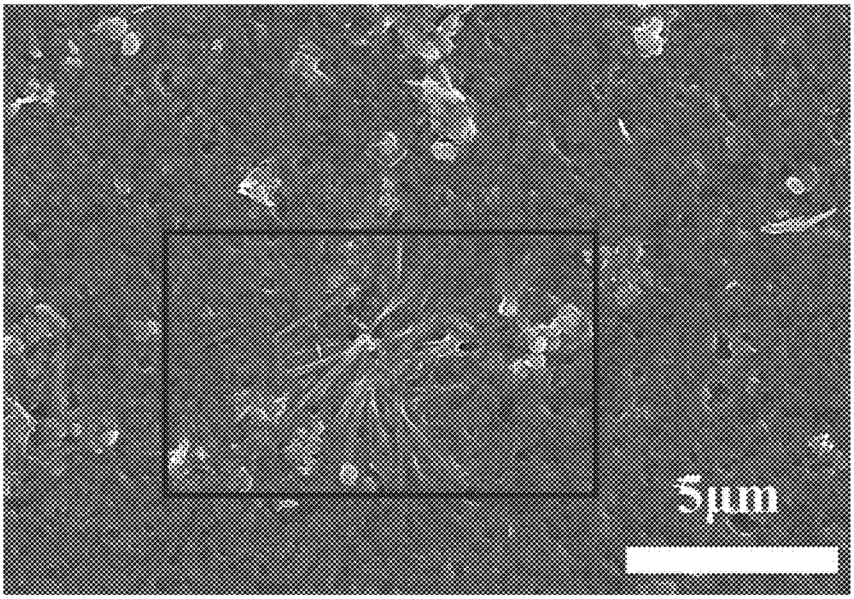
FIG. 3 is a surface electron microscope diagram of a composite nanofiltration membrane prepared in Example 4.

The surface electron microscope diagram of the self-supporting composite nanofiltration membrane prepared in this example was shown in FIG. 3. Unlike the traditional spherical, leaf-like or ridge-valley-like polyamide separation layer, the composite nanofiltration membrane prepared in this example had a relatively smooth surface, and the porous graphene-based two-dimensional sheet material maintained the sheet-like morphology during synthesis and was uniformly wrapped by a polyamide layer.

Figure 4:
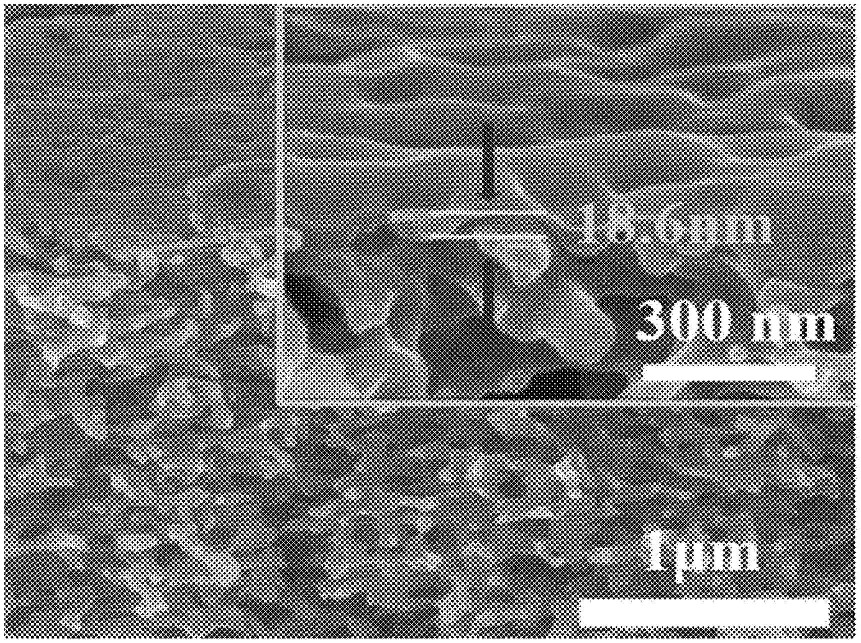
FIG. 4 is a cross-sectional electron microscope diagram of the composite nanofiltration membrane prepared in Example 4.

The cross-sectional electron microscope diagram of the aforementioned self-supporting composite nanofiltration membrane was shown in FIG. 4, and the thickness of the separation layer of the prepared composite nanofiltration membrane was 18.6 nm, showing an ultra-thin structure.

The aforementioned self-supporting composite nanofiltration membrane was tested with a Congo Red and methyl orange solution system of 0.1 g·$L^{-1}$ and a $Na_2SO_4$ solution system of 1 g·$L^{-1}$ under a pressure of 0.2 MPa. It had a permeation flux of 28.4 L·$m^{-2}$·$h^{-1}$·$bar^{-1}$, a rejection rate of 99.4% for Congo Red, a rejection rate of 26.7% for methyl orange, a rejection rate of 16.7% for $SO4^{2-}$ ions, and a separation factor of 98.51 for Congo Red/$SO_4^{2-}$. The self-supporting composite nanofiltration membrane was tested for permeability for 48 h, and it was found that it could maintain a high rejection rate over 99% for Congo Red, while the permeation flux was slightly reduced. In a strong-alkali resistance test, it still could maintain the high rejection rate over 99% for Congo Red, and the permeation flux did not change much.

Example 5

(1) it was the same as the step (1) of Example 1;

(2) the other steps and conditions were the same as the step (2) of Example 1 except that the time for the interfacial polymerization reaction was 120 s; and (3) it was the same as the step (3) of Example 2.

The prepared nanofiltration membrane was tested with a Congo Red solution system of 0.1 g·$L^{-1}$ under a pressure of 0.2 MPa. It had a permeation flux of 66.8 L·$m^{-2}$·$h^{-1}$·$bar^{-1}$, and a rejection rate of 90.4% for Congo Red.

What is claimed is:

1. A method for preparing a self-supporting composite nanofiltration membrane, comprising the following steps:

(1) a preparation of amino graphene quantum dots: dispersing a predetermined amount of graphene oxide in distilled water by ultrasonic shaking to obtain a graphene oxide dispersion, adding a predetermined amount of ammonia solution to the graphene oxide dispersion, mixing the graphene oxide dispersion and the ammonia solution to obtain a uniform mixture and transferring the uniform mixture to a reaction kettle; sealing and placing the reaction kettle in a muffle furnace and heating the reaction kettle to conduct a chemical cleavage reaction, and after a completion of the chemical cleavage reaction, cooling, filtering to obtain a filtrate, distilling the filtrate at a reduced pressure, freeze drying to obtain amino graphene quantum dots powder, re-dissolving the amino graphene quantum dots powder to obtain the re-dissolved amino graphene quantum dots solution, filtering the re-dissolved amino graphene quantum dots solution, and freeze drying to obtain the amino graphene quantum dots, wherein:

a concentration of the graphene oxide dispersion is 0.01-1 w/v %, and a volume ratio of the ammonia solution to the graphene oxide dispersion is (1-4):1; and a temperature in the muffle furnace is 100-140° C., and a reaction time is 4-6 h;

(2) a preparation of a porous graphene-based two-dimensional sheet material: using a substrate membrane as a base membrane, first rinsing the substrate membrane with distilled water and then placing the rinsed substrate membrane at a bottom of a sand core funnel; preparing the amino graphene quantum dots obtained in the step (1) into an aqueous solution of the amino graphene quantum dots with a concentration of 0.01-1 w/v % to obtain an aqueous solution of the amino graphene quantum dots and then adjusting the pH of the aqueous solution of the amino graphene quantum dots to 11-13 to obtain a pH-adjusted aqueous solution of the amino graphene quantum dots, sequentially adding, in turn, first the pH-adjusted aqueous solution of the amino graphene quantum dots and then a polyacyl chloride organic solution with a concentration of 0.01-1 w/v % into the sand core funnel, thereby contacting the pH-adjusted aqueous solution of the amino graphene quantum dots with the polyacyl chloride organic solution at an interface in the sand core funnel and allowing an interfacial polymerization reaction to occur at the interface for a predetermined time to obtain the porous graphene-based two-dimensional sheet material; and (3) a preparation of a composite nanofiltration membrane: immediately after the step (2), injecting an aqueous solution of polyamine at a uniform speed into the aqueous phase solution in the sand core funnel obtained after the interfacial polymerization reaction in the step (2) by an injector to continue the interfacial polymerization reaction between the polyamine and the polyacyl chloride, wherein a polyamide formed by the continued interfacial polymerization reaction encapsulates the porous graphene-based two-dimensional sheet material in situ to obtain a porous graphene/polyamide separation layer, removing an aqueous phase solution and an organic phase solution from the sand core funnel, loading the porous graphene/polyamide separation layer onto the substrate membrane, and subjecting to a heat treatment to prepare the self-supporting composite nanofiltration membrane.

2. The method according to claim 1, wherein in the step (1), a first filtering is conducted using a filter membrane having a pore size of 0.22 μm, and a second filtering is conducted using a filter membrane having a pore size of 0.1 μm, and the operation of distilling at the reduced pressure is conducted at a temperature of 70-90° C. for a time of 0.5-2 h.

3. The method according to claim 1, wherein the substrate membrane in the step (2) is selected from the group consisting of a polysulfone, polyethersulfone, polyvinylidene fluoride, polyvinyl chloride, and polytetrafluoroethylene ultra/microfiltration membrane.

4. The method according to claim 1, wherein a volume ratio of the aqueous solution of the amino graphene quantum dots to the organic solution of polyacyl chloride in the step (2) is (1-10):1, and a time of the interfacial polymerization reaction is 10-120 s.

5. The method according to claim 1, wherein in the step (2), the polyacyl chloride is at least one selected from the group consisting of trimesoyl chloride, pyromellitic acid chloride, phthaloyl chloride, isophthaloyl chloride and terephthaloyl chloride; and a solvent of the organic solution is at least one selected from the group consisting of n-hexane, cyclohexane, n-heptane and isoparaffin.

6. The method according to claim 1, wherein in the step (3), the polyamine is at least one selected from the group consisting of ethylenediamine, butanediamine, pentanediamine, diethylenetriamine, triethylenetetramine, tetraethylenepentamine, piperazine, o-phenylenediamine, m-phenylenediamine and p-phenylenediamine.

7. The method according to claim 1, wherein a concentration of the aqueous solution of polyamine in the step (3) is 0.01-0.1 w/v, and a time for the continued interfacial polymerization reaction is 10-120 s.

8. The method according to claim 1, wherein the heat treatment in the step (3) is conducted at a temperature of 40-50° C. for a treatment time of 5-15 min.

* * * * *